(12) United States Patent
Hafer et al.

(10) Patent No.: US 8,069,289 B2
(45) Date of Patent: Nov. 29, 2011

(54) MODBUS REGISTER DATA FORMATTING

(75) Inventors: Kevin G. Hafer, Douglassville, PA (US); Thomas Devine, Warminster, PA (US)

(73) Assignee: Ametek, Inc., Paoli, PA (US)

( * ) Notice: Subject to any disclaimer, the term of this patent is extended or adjusted under 35 U.S.C. 154(b) by 0 days.

(21) Appl. No.: 12/533,397

(22) Filed: Jul. 31, 2009

(65) Prior Publication Data

US 2010/0030935 A1    Feb. 4, 2010

Related U.S. Application Data

(60) Provisional application No. 61/085,119, filed on Jul. 31, 2008.

(51) Int. Cl.
*G06F 13/42* (2006.01)
*G06F 13/14* (2006.01)
*G06F 13/10* (2006.01)

(52) U.S. Cl. .......................... 710/105; 710/110
(58) Field of Classification Search .............. 710/105
See application file for complete search history.

(56) References Cited

U.S. PATENT DOCUMENTS

| | | | |
|---|---|---|---|
| 6,571,132 B1 * | 5/2003 | Davis et al. ............... 700/2 |
| 6,725,369 B1 * | 4/2004 | Farmer et al. ............. 713/100 |
| 7,299,310 B2 * | 11/2007 | Aschenbrenner .......... 710/71 |
| 7,443,886 B1 | 10/2008 | Gross | |
| 7,793,017 B2 * | 9/2010 | Gehring et al. ............ 710/63 |
| 2005/0108442 A1 * | 5/2005 | Aschenbrenner .......... 710/1 |
| 2005/0228509 A1 * | 10/2005 | James ........................ 700/19 |
| 2007/0055391 A1 * | 3/2007 | Schneider et al. ......... 700/28 |
| 2007/0280285 A1 * | 12/2007 | Vanderah et al. ......... 370/466 |
| 2008/0126659 A1 * | 5/2008 | Klofer et al. ............. 710/302 |
| 2008/0235420 A1 | 9/2008 | Wei | |
| 2009/0013092 A1 | 1/2009 | Pao et al. | |

FOREIGN PATENT DOCUMENTS

WO    WO 2007096586 A1 *    8/2007

\* cited by examiner

*Primary Examiner* — Ryan Stiglic
(74) *Attorney, Agent, or Firm* — Stradley Ronon Stevens & Young LLP (57) ABSTRACT

A Modbus data protocol register formatting system and method are disclosed. The system and method provide for the Modbus communications protocol request and recall of data stored in a register in the data base native format, and the conversion of the data into a different requested format. The system and method similarly provide for the writing of data into a device register from a known variable format into the data base native format. The ability to convert the data by a format converter after recalling the data, or before storing the data, obviates the need to store or write data in different or multiple formats. The inventive method uses a modified register mapping that comprises defined mapping elements identifying the data address location, the requested data format, along with the data variable. The register mapping is fully variable to provide for a wide range of data formats and data address formats. The inventive system uses, in addition to the Modbus master and slave devices, a format converter that converts the data recalled into the requested data format, or converts the data to be written into the slave device native data format.

19 Claims, 5 Drawing Sheets

MODBUS REGISTER DATA FORMATTING

RELATED APPLICATION

This application claims the benefit of priority to U.S. Provisional Patent Application Ser. No. 61/085,119, filed on Jul. 31, 2008, the text and figures of which are incorporated into this application by reference.

FIELD OF THE INVENTION

The present invention relates to data communications protocols. More particularly, the disclosed invention relates to a modified Modbus data communications protocol that provides a method and system capable of requesting and recalling data that is stored in a native format in a slave device data register, and converting the recalled data to a different requested data format. The modified communications protocol uses a defined Modbus protocol register address that includes a data location portion and a data format portion. Through use of the inventive method and system, the stored data need not be stored in varied formats or duplicated into varied formats, but is converted from the native format to a requested data format as needed, and as determined by the Modbus protocol register address. The inventive method and system also provide for the writing of data into a device register from a known variable format into the data base native format.

BACKGROUND OF THE INVENTION

Data communication standards and communication protocols are well known, widely used, and wide spread. Such standards provide the basis for various electronic devices to be able to communicate with each other. Certain communication standards have been in place since the 1970s and, due to their flexibility and ease of use, are still extensively used today in digital and analog communications between devices.

One such communications standard is the Modbus protocol. The original Modbus interface, created in late 1970s, operated on the RS-232 standard, with later interfaces was operated and running on the RS-485 standard. Because of the flexibility of the Modbus protocol, including the ability for it to be implemented and use by computer processors as well as intelligent sensors, the Modbus communications protocol developed into widely used standard that is still in use today. Indeed, because of the prevalence of the Modbus protocol, its use will likely continue for many years to come.

Modbus is a master device/slave device communications protocol that provides for the master device to request or initiate a message and the slave device to response or reply to the master device message. In data transmission, the Modbus communications are predominantly reading and writing of data from one register in a device to another register in one or more other devices. One of the strengths of the Modbus communications protocol is that the format of the data being transmitted is not limited by the protocol. That is, Modbus works on most any data format determined or set by the master and slave devices so long as the data formats are compatible.

There in is one of the limitations of the Modbus protocol: while there is substantial flexibility in usage of the Modbus protocol, there are often problems with interoperability between devices storing, retrieving and requesting different data formats. More particularly, while a slave device may have as a native data format floating point data, a request may come from a master device seeking data for a register with a 32-bit integer format. Other formats widely used for sensors include 16-bit integer format. Where multiple master and slave devices are communicating, the efficient inter-communication between such devices may be hindered if not prevented.

Systems have been designed for communication protocols. For example, U.S. Pat. No. 7,443,886 (the "'886 patent"), issued to Gross for a Communication Protocol System and Method, discloses a specific expanded protocol having a data packet, a control byte, and a checksum byte. The control byte of the protocol further includes several bits to identify (a) the address of a slave controller, (b) the data type being transmitted, (c) the source of the data, (d) whether data is included in the data packet, (e) the state of the master controller, and (f) the run/stop state of the master controller. The '866 patent does not however include any process to convert the format of the data packet being transmitted.

Another design for Modbus communications protocol in shown in U.S. patent application Ser. No. 11/689,513, Publication No. US 2008/0235420, by Wei (the "'513 application"), for a Method Of Detecting Master/Slave Response Time-Out Under Continuous Packet Format Communications Protocol. The disclosed method in the '513 application provides for the continuous sending of Modbus requests to a slave device through a detection device and to record each Modbus request sent time, and to have the slave device provide back to the detection device a response for each Modbus request. Calculations are then used to determine the precise response time-out of the slave device. As with other known prior art, the '513 application does not include any processing of the data packet transmitted to be able to convert the format of the data transmitted.

What is needed is a Modbus communications protocol that allows the master device to recall data from a slave device, where the data is stored in the slave device in the slave device's native format, and then allows for converting the data to another format based upon the Modbus register address protocol. What is also needed is a communications protocol that allows a master device to write data to a slave device, where the data format is to be converted to the slave device native format based upon the register address protocol. Such a Modbus communications protocol and method and system have not been created or recognized in the communications field.

SUMMARY OF THE INVENTION

The above noted problems, which are inadequately or incompletely resolved by the prior art are completely addressed and resolved by the present invention.

A preferred aspect of the present invention is a method for recalling and converting data from a slave device using a Modbus communications protocol register address, comprising the steps of identifying from the protocol register address a register location in the slave device from which to recall data stored in the slave device native format; identifying from the protocol register address a data format to which the recalled data is to be converted; recalling the data stored in the identified register location; converting the recalled data from the recalled data native format to the requested conversion data format; and transmitting the converted data to the master device.

Another preferred aspect of the present invention is a method for converting data to be recalled from or written to a slave device using a Modbus communications protocol register address, comprising the steps of determining whether a master device is requesting to recall data from a slave device or requesting to write data to said slave device; and if the master device is requesting to recall data from the slave device, then (a) identifying from the protocol register address a register location in the slave device from which to recall data stored in the slave device native format; (b) identifying from the protocol register address a data format to which the recalled data is to be converted; (c) recalling the data stored in the identified register location; (d) converting the recalled data from the recalled data native format to the requested conversion data format; and (e) transmitting the converted data to the master device; and additionally if the master device is requesting to write data to the slave device, then (f) identifying from the protocol register address a register location in the slave device to which data is to be stored in the slave device in a native format; (g) identifying from the protocol register address a data format from which data to be stored is to be converted; (h) converting the data from the identified data format into the slave device native format; and (i) writing the converted data to the identified register location in the slave device.

In another preferred embodiment of the present invention, a data communications system providing for a master device to recall data from a slave device using a Modbus communications protocol register address, comprises a computer processor for executing the following steps: (a) identifying from the protocol register address a register location in the slave device from which to recall data stored in the slave device native format; (b) identifying from the protocol register address a data format to which the recalled data is to be converted; (c) recalling the data stored in the identified register location; (d) converting the recalled data from the recalled data native format to the requested conversion data format; and (e) transmitting the converted data to the master device.

The invention will be best understood by reading the following detailed description of the several disclosed embodiments in conjunction with the attached drawings that briefly described below.

BRIEF DESCRIPTION OF THE DRAWINGS

The invention is best understood from the following detailed description when read in connection with the accompanying drawings. It is emphasized that, according to common practice, the various features of the several drawings are not to scale, and the invention is not limited to the precise arrangement as may be shown in the accompanying drawings. On the contrary, the dimensions and locations of the various features are arbitrarily expanded or reduced for clarity, unless specifically noted in the attached claims.

DETAILED DESCRIPTION OF PREFERRED EMBODIMENTS

The present invention is a method and system for improved register formatting of Modbus data communication protocols. The system and method provide for Modbus communications protocol requests and recall of data stored in a register in a device, in that device's data native format, and then the conversion of the data into a different requested format where the different format is set by the communications protocol request. The system and method also provide for the writing of data into a device register from a known format into the storage device data base native format.

As shown and disclosed in detail below, the inventive method uses a modified Modbus register mapping that comprises defined mapping elements identifying (a) the data address location, (b) the requested data format, and (c) the data variable. In a preferred embodiment of the invention, the register mapping is fully variable to provide for a variety of desired data formats and data address formats.

Figure 1:
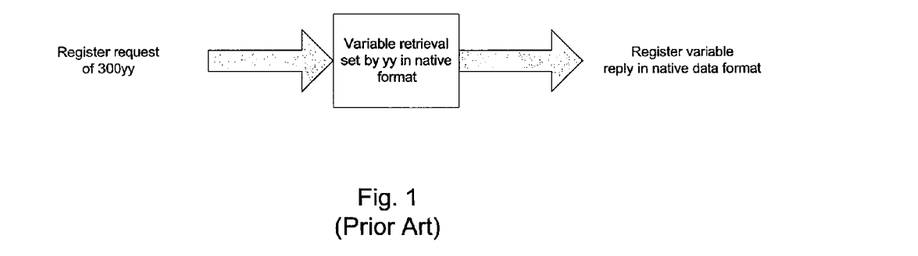
FIG. 1: is a flowchart illustrating an example of prior art Modbus data retrieval.

As shown in FIG. 1, an example prior art Modbus data request flow simply entails the register request from a master device to retrieve a variable from the slave device. The data retrieval request by a Modbus master device (not shown) uses, by way of an example of register protocol, register format A00yy. In this format, the requested retrieval is for variable yy as stored in the slave device in the data format that is native to the slave device. Because the master device simply requests the data stored at a particular location within the slave device, the retrieved data will necessarily be returned in the slave data native storage format. Such data formats used by various communications and sensor devices can be, by way of example, floating point, 16-bit integers, or 32-bit integers.

If there were a need to access, view or transmit the retrieved data in a format other than the native device format, the data stored in the slave device would either have to be duplicated within the slave device into the alternate desired format or formats, or there would need to be a separate process to convert the data after it is retrieved from the slave device into the desired data format. The inventive method and system provide an efficient solution to this cumbersome problem by combining the data retrieval request along with data conversion to a format identified within the protocol of the retrieval request.

Figure 2:
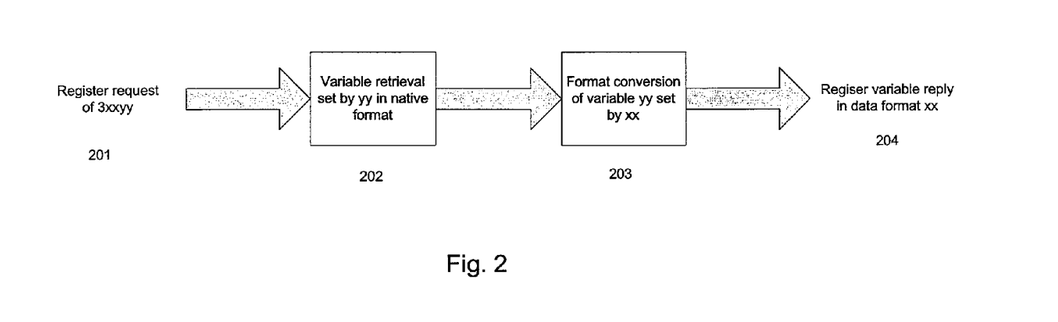
FIG. 2: is a flowchart illustrating a preferred embodiment of the present invention Modbus data retrieval with data conversion determined by a data register identifier.

In a preferred embodiment of the inventive method, FIG. 2 illustrates a communications flow of a request for data by a Modbus master device, for data from a slave device, using a modified register format Axxyy. The register format of Axxyy is modified from the FIG. 1 example of A00yy. In this modified register format, the data requested is still variable yy, but the request 201 also includes register information xx which identifies and sets the desired data format for variable yy. That is, register xx identifies the format for variable yy to be retrieved by the master device. As illustrated in FIG. 2, the method includes the data retrieval step 202, followed by the data conversion step 203, which provides for the retrieval of the data yy as stored in the slave device native format, and then conversion of variable yy into the desired format xx, as set within the Modbus protocol Axxyy, and as part of the register reply 204.

The advantages of the inventive register protocol include that the slave device need only store the data in the slave device's native device format. Duplication of storage for varied or multiple data formats is not necessary using the inventive method. That is, the inventive method allows storage of the data within the slave device in its native format, and then conversion of the data yy into the desired format xx as part of the request and retrieval. Moreover, with a data conversion processor capable of varied data conversions, the user can change which format he or she wishes to retrieve the data simply by identifying and revising the desired data format within the Modbus register request, or by selecting the appropriate register identifier xx.

Figure 3:
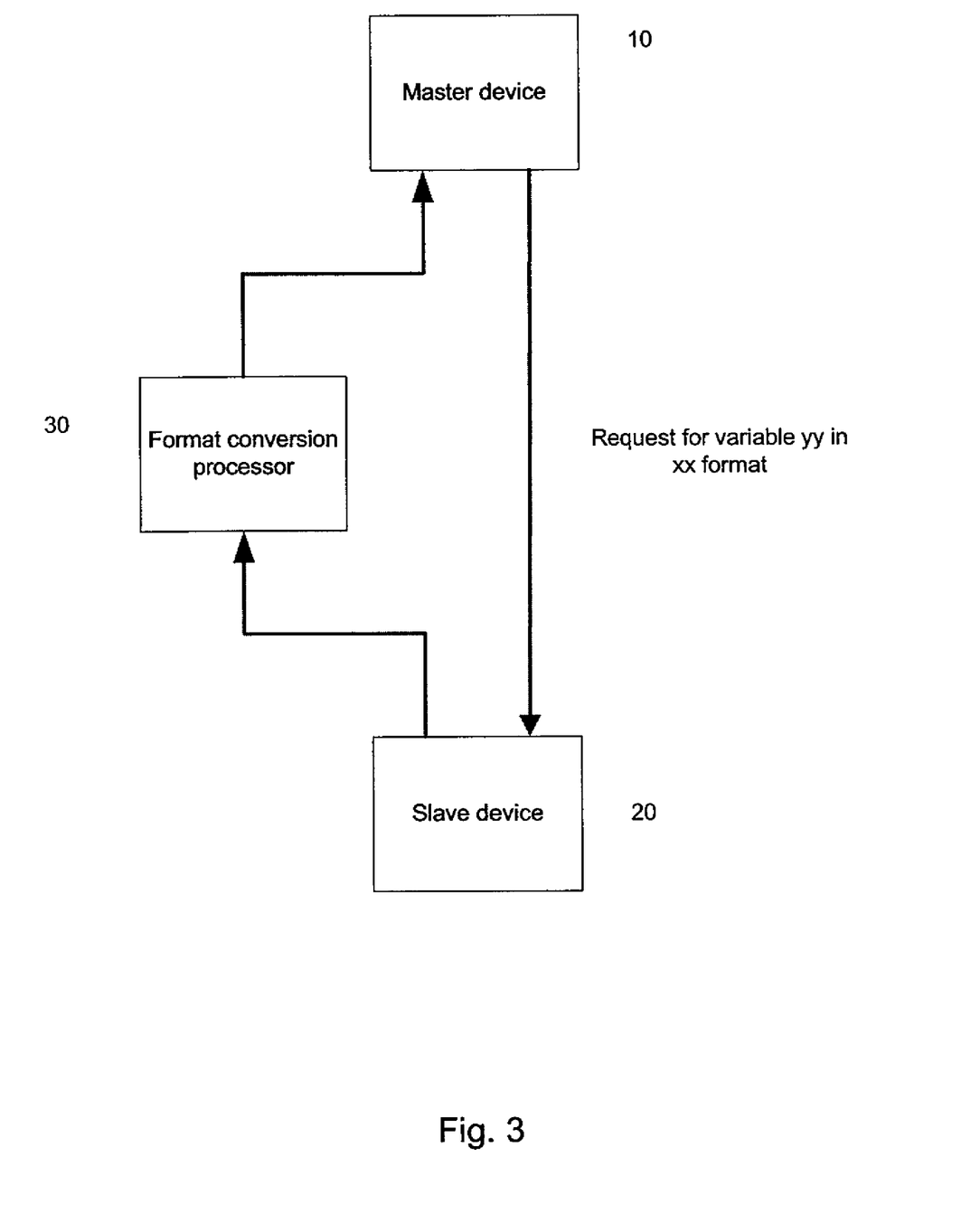
FIG. 3: is an illustration of a preferred embodiment of the present invention system showing the elements and reading communications links between the elements using Modbus data communications protocol with data conversion determined by a data register identifier.

As further illustrated in FIG. 3, the inventive system uses, in addition to the Modbus master 10 and slave 20 devices, a processor 30 to convert variable data yy into the requested data format xx. The same modified register protocol can also be used to write data yy to a slave device in the slave device's native data format. The communications flow shown in FIG. 4 system uses the Modbus master device 10 and slave device 20 along with a processor 30 that converts data or variable yy into the data format xx necessary to be stored or written in the slave device 20.

While the above examples are illustrated showing a Modbus address protocol of Axxyy, equally effective address protocols include, by way of several examples, 12xxxyyy, 34xxyyy, 123xxxyyy, 456xxyyyy, 789xxxyy, and so on. In each of these examples the "xxx," "xx," or "x" identifies the address portion for the data format, while the "yyyy," "yyy," or "yy" identifies the address portion for the data variable. Obvious further alternatives include larger address locations for the data format and/or larger or smaller address locations for the data variable. Similarly, the inventive Modbus address protocol may include multiple address registers for multiple data variables to be retrieved. By way of example, such a Modbus data address protocol could take the form of $12xxyy_1yy_2yy_3 \ldots yy_n$, where the $yy_1$, $yy_2$, $yy_3$, through $yy_n$ are the variables 1 through n to be retrieved in the xx data format.

In another preferred embodiment of the inventive method and system, the Modbus address protocol could include multiple address registers for multiple data variables to be retrieved, with multiple data format addresses that correspond to the multiple data variables. One example of such a Modbus register protocol could be in the form of $12xx_1xx_2xx_3 \ldots xx_nyy_1yy_2yy_3 \ldots yy_n$, where the $yy_1$, $yy_2$, $yy_3$, through $yy_n$ are the variables 1 through n to be retrieved in the respective $xx_1$, $xx_2$, $xx_3$, through $xx_n$ data format.

The inventive method may operate on communications protocols in either remote terminal unit ("RTU") or ASCII format to the analyze the transmitted messages. Such formats are known and widely used in the communications field. The inventive method is designed to be equally applicable and effectively used with other communication formats. As is known in the art, the determination of whether RTU or ASCII format is used, may be set by the user as a function of the slave device protocol. Aspects of preferred embodiments of the inventive method may also include known steps often used in communications systems, including message validation. Such validation steps or routine would normally include, for example, after receipt of a communications message, address validation, buffer length checks, and message checksum.

Figure 5:
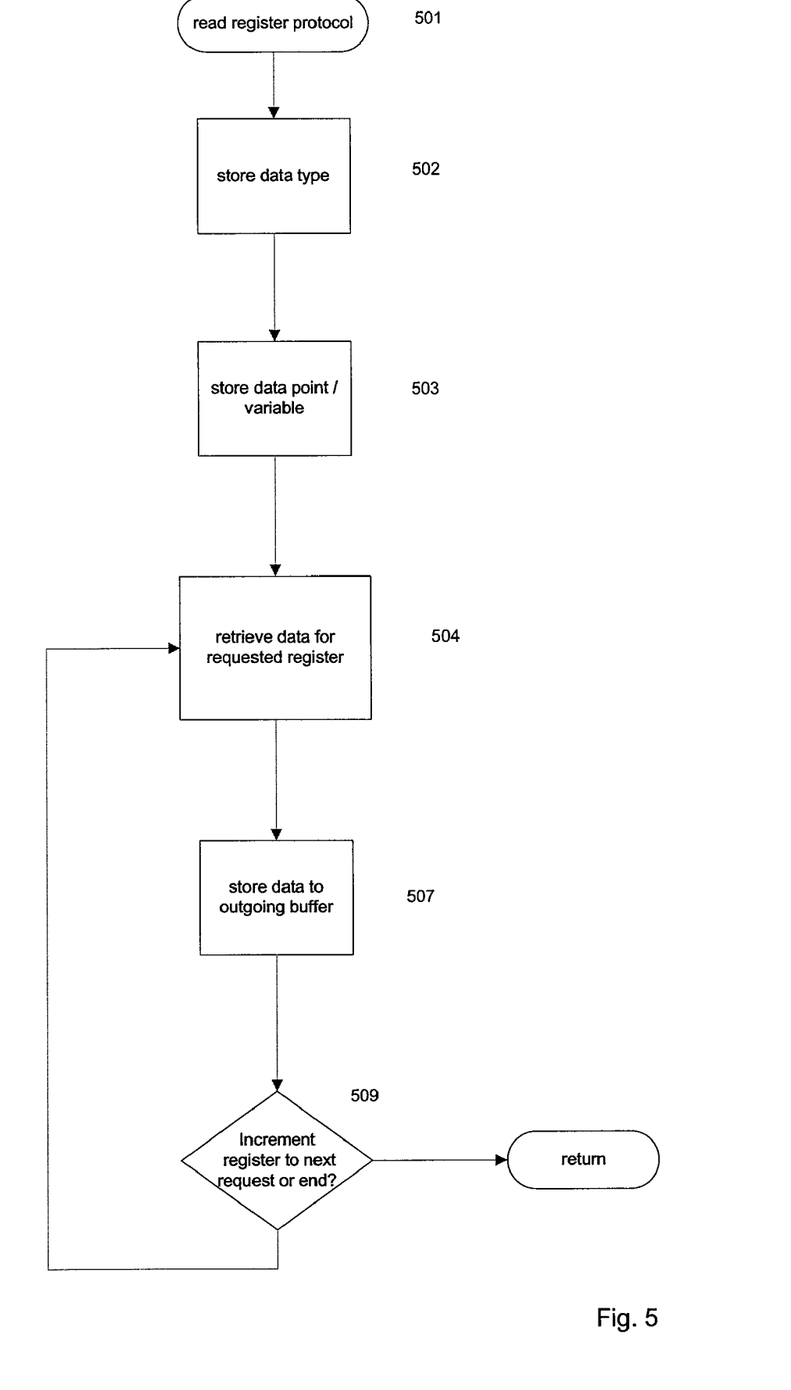
FIG. 5: is a flowchart of a preferred embodiment of the present invention showing a method of reading, storing and retrieving data based upon the identifiers provided in the register protocol.

In further detail of a preferred embodiment of the inventive method, FIG. 5 illustrates the flow of a routine for (a) reading the register protocol requested by the master device, (b) storing the format or type of data as identified in the protocol, (c) storing the address for the variable identified in the protocol, and (d) retrieving the data and storing the data in an outgoing data buffer.

More particularly, the initial step 501 is to read the register protocol. Next the data type or format as identified in the register protocol read is then stored 502. In an example embodiment where the data protocol is in the form of Axxyy, as previously shown in FIG. 2, the data format xx is stored 502, and the data variable yy is also stored 503. The routine next retrieves 504 the data and stores 507 the data in an outgoing buffer. After the storing 507 of the data, the routine increments 509 the register to the next data register to be requested and the process is repeated through steps 504, 507, and 509 until the last data register has been requested.

Figure 6:
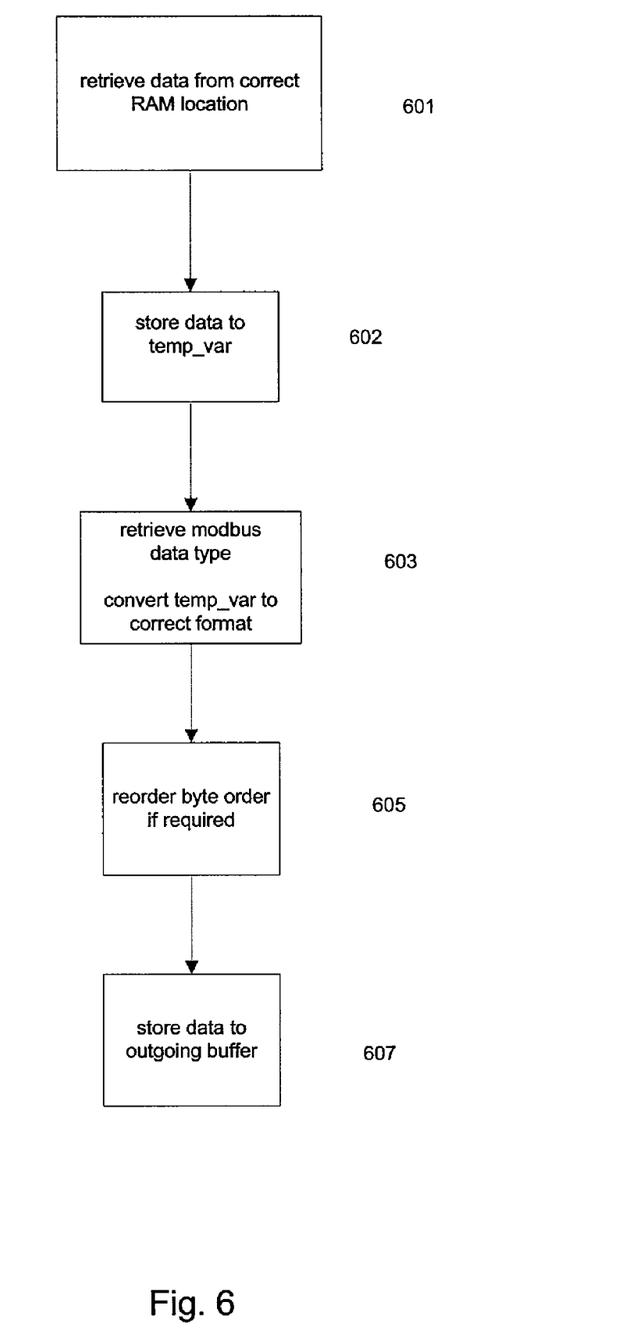
FIG. 6: is a flowchart of a preferred embodiment of the present invention showing a method of obtaining data, converting the data, and then storing the converted data in an outgoing buffer.

An example of a preferred embodiment of the inventive retrieval routine that follows the read and storage routine of FIG. 5, is illustrated in FIG. 6. The method retrieves 601 the data variable from the identified data register. The retrieved data variable is then stored 602 in a temporary register, temp_var. The method next retrieves 603 the identified data format xx for the retrieved data yy and converts the data variable in temp_var into the desired identified data format. As noted previously, such formats could be, in preferred embodiments, integer, floating point, or long formats.

As is known in the data communications art, the ordering of data transmitted by data bus may need to be realigned or reordered to ensure that the data string is transmitted in the form intended. Accordingly, the inventive method next, if necessary, reorders 605 the byte order to place the data variables in correct order position. Examples of such reordering could be Big Endian, with the most significant digits placed at the end, or Little Endian, with the least significant digits placed at the end of the data string. Finally, the reordered, retrieved, and converted data variable is placed 607 into the outgoing buffer.

Figure 4:
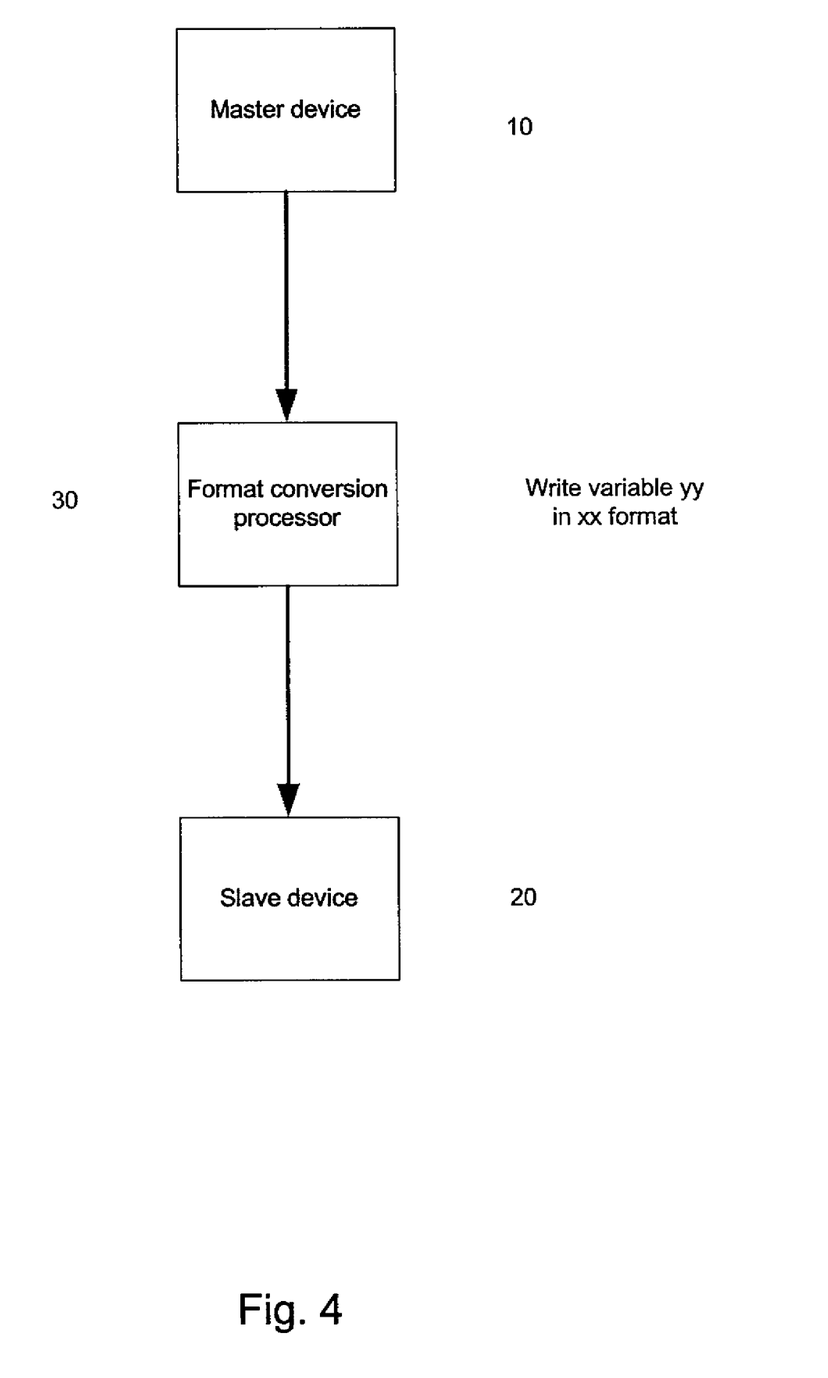
FIG. 4: is an illustration of a preferred embodiment of the present invention system showing the elements and writing communications links between the elements using Modbus data communications protocol with data conversion determined by a data register identifier.

The inventive system, as shown in FIGS. 3 and 4, in preferred embodiments, include as primary elements a master (requesting) device 10, a slave device 20, and the converting processor 30 to convert the retrieved or written data variable based upon the data format identified in the modified Modbus register protocol. The system converting processor 30 is designed to execute the inventive method steps as described and disclosed above.

The above detailed description teaches certain preferred embodiments of the inventive method and system for retrieving and writing communications data using a modified Modbus data register protocol. The modified Modbus data register protocol includes the data to be retrieved or written, along with an identifier or designation of the desired format for retrieved data, or desired format for writing and storing of the data. With the inventive method and system and disclosed, increased flexibility is provided to retrieve and write data in a variety of data formats without the need for duplicating the storage of data in each of the potential and desired data formats.

While preferred embodiments of the inventive Modbus register protocol have been described and disclosed herein, it will be recognized by those skilled in the art that other modifications and/or substitutions are possible and such modifications and substitutions are within the true scope and spirit of the present invention. It is likewise understood that the attached claims are intended to cover all such modifications and/or substitutions.

What is claimed is:

1. A method for recalling and converting data from a slave device using a Modbus communications protocol register address, comprising the steps of:
   identifying from the protocol register address a register location in the slave device from where to recall data stored in the slave device;
   identifying from the protocol register address a data format to which the recalled data is to be converted;
   recalling the data stored in the identified register location;
   converting the recalled data from the slave device to the requested data format; and
   transmitting the converted data to a master device.

2. The method for recalling and converting data from a slave device using a Modbus communications protocol register address, of claim 1, wherein the Modbus communications protocol register address comprises:
   (a) a data location portion; and
   (b) a data format portion.

3. The method for recalling and converting data from a slave device using a Modbus communications protocol register address, of claim 1, wherein the Modbus communications protocol register address comprises:
   (a) at least two data location portions; and
   (b) at least two corresponding data format portions.

4. The method for recalling and converting data from a slave device using a Modbus communications protocol register address, of claim 2, wherein the Modbus communications protocol register address is in the format of Axxyy, wherein the "xx" portion of the protocol register is a data location portion; and wherein the "yy" portion of the protocol register is a data format portion.

5. A method for converting and writing data to a slave device using a Modbus communications protocol register address, comprising the steps of:
   identifying from the protocol register address a register location in the slave device to which data is to be stored in the slave device in a native format;
   identifying from the protocol register address a data format from which data to be stored is to be converted;
   converting the data from the identified data format into the slave device native format; and
   writing the converted data to the identified register location in the slave device.

6. The method for converting and writing data from a slave device using a Modbus communications protocol register address, of claim 5, wherein the Modbus communications protocol register address comprises:
   (a) a data location portion; and
   (b) a data format portion.

7. The method for converting and writing data from a slave device using a Modbus communications protocol register address, of claim 6, wherein the Modbus communications protocol register address is in the format of Axxyy, wherein the "xx" portion of the protocol register is a data location portion; and wherein the "yy" portion of the protocol register is a data format portion.

8. A method for converting data to be recalled from or written to a slave device using a Modbus communications protocol register address, comprising the steps of:
   determining whether a master device is requesting to recall data from a slave device or requesting to write data to said slave device;
   if the master device is requesting to recall data from the slave device, then
      (a) identifying from the protocol register address a register location in the slave device from which to recall data stored in the slave device native format;
      (b) identifying from the protocol register address a data format to which the recalled data is to be converted;
      (c) recalling the data stored in the identified register location;
      (d) converting the recalled data from the recalled data native format to the requested conversion data format; and
      (e) transmitting the converted data to the master device; and
   if the master device is requesting to write data to the slave device, then
      (f) identifying from the protocol register address a register location in the slave device to which data is to be stored in the slave device in a native format;
      (g) identifying from the protocol register address a data format from which data to be stored is to be converted;
      (h) converting the data from the identified data format into the slave device native format; and
      (i) writing the converted data to the identified register location in the slave device.

9. The method for converting data to be recalled from or to be written to a slave device using a Modbus communications protocol register address, of claim 8, wherein the Modbus communications protocol register address comprises:
   (a) a data location portion; and
   (b) a data format portion.

10. The method for converting data to be recalled from or to be written to a slave device using a Modbus communications protocol register address, of claim 8, wherein the Modbus communications protocol register address comprises:
    (a) at least two data location portions; and
    (b) at least two corresponding data format portions.

11. A data communications system providing for a master device to recall data from a slave device using a Modbus communications protocol register address, comprising:
    a computer processor for executing the following steps:
       (a) identifying from the protocol register address a register location in the slave device from which to recall data stored in the slave device native format;
       (b) identifying from the protocol register address a data format to which the recalled data is to be converted;
       (c) recalling the data stored in the identified register location;
       (d) converting the recalled data from the recalled data native format to the requested conversion data format; and
       (e) transmitting the converted data to the master device.

12. The data communications system providing for a master device to recall data from a slave device using a Modbus communications protocol register address, of claim 11, wherein the Modbus communications protocol register address comprises:
    (a) a data location portion; and
    (b) a data format portion.

13. The data communications system providing for a master device to recall data from a slave device using a Modbus communications protocol register address, of claim 11, wherein the Modbus communications protocol register address comprises:
    (a) at least two data location portions; and
    (b) at least two corresponding data format portions.

14. A data communications system providing for a master device to write data to a slave device using a Modbus communications protocol register address, comprising:
  a computer processor for executing the following steps:
    (a) identifying from the protocol register address a register location in the slave device to which data is to be stored in the slave device in a native format;
    (b) identifying from the protocol register address a data format from which data to be stored is to be converted;
    (c) converting the data from the identified data format into the slave device native format; and
    (d) writing the converted data to the identified register location in the slave device.

15. The data communications system providing for a master device to write data to a slave device using a Modbus communications protocol register address, of claim 14, wherein the Modbus communications protocol register address comprises:
  (a) a data location portion; and
  (b) a data format portion.

16. The data communications system providing for a master device to write data to a slave device using a Modbus communications protocol register address, of claim 14, wherein the Modbus communications protocol register address comprises:
  (a) at least two data location portions; and
  (b) at least two corresponding data format portions.

17. A data communications system providing for a master device to recall data from, or write data to a slave device using a Modbus communications protocol register address, comprising:
  a computer processor for executing the following steps:
    (a) determining whether a master device is requesting to recall data from a slave device or requesting to write data to said slave device;
    if the master device is requesting to recall data from the slave device, then
      (1) identifying from the protocol register address a register location in the slave device from which to recall data stored in the slave device native format;
      (2) identifying from the protocol register address a data format to which the recalled data is to be converted;
      (3) recalling the data stored in the identified register location;
      (4) converting the recalled data from the recalled data native format to the requested conversion data format; and
      (5) transmitting the converted data to the master device; and
    (b) if the master device is requesting to write data to the slave device, then
      (6) identifying from the protocol register address a register location in the slave device to which data is to be stored in the slave device in a native format;
      (7) identifying from the protocol register a data format from which data to be stored is to be converted;
      (8) converting the data from the identified data format into the slave device native format; and
      (9) writing the converted data to the identified register location in the slave device.

18. The data communications system providing for a master device to recall data from, or write data to a slave device using a Modbus communications protocol register address, of claim 17, wherein the Modbus communications protocol register address comprises:
  (a) a data location portion; and
  (b) a data format portion.

19. The data communications system providing for a master device to recall data from, or write data to a slave device using a Modbus communications protocol register address, of claim 17, wherein the Modbus communications protocol register address comprises:
  (a) at least two data location portions; and
  (b) at least two corresponding data format portions.

* * * * *